United States Patent
Srinivas et al.

[11] Patent Number: 5,934,150
[45] Date of Patent: Aug. 10, 1999

[54] REMOTE CONTROL ASSEMBLY HAVING A LOCKING TERMINAL

[75] Inventors: Srinath Srinivas, Rochester Hills; Miroslaw T. Przybyl, Clinton Township, both of Mich.

[73] Assignee: Teleflex Incorporated, Plymouth Meeting, Pa.

[21] Appl. No.: 09/002,983

[22] Filed: Jan. 5, 1998

[51] Int. Cl.⁶ .................................. F16C 1/10; F16B 7/10
[52] U.S. Cl. .................. 74/502.4; 74/500.5; 74/501.5 R; 74/502.6; 403/104; 403/379.1
[58] Field of Search ............... 74/500.5–502.6; 403/316, 294, 104, 292, 315, 376, 379.1–379.6; 192/111 A, 111 B

[56] References Cited

U.S. PATENT DOCUMENTS

| | | | |
|---|---|---|---|
| 4,887,930 | 12/1989 | Chaczyk et al. | 7/10 |
| 5,220,832 | 6/1993 | Petruccello | 1/10 |
| 5,293,785 | 3/1994 | Lichtenberg | 1/10 |
| 5,398,556 | 3/1995 | Moore | 1/22 |
| 5,531,134 | 7/1996 | Petruccello | 74/502.4 |
| 5,571,237 | 11/1996 | Lu et al. | 74/502.4 |
| 5,588,334 | 12/1996 | Lu et al. | 1/10 |
| 5,598,743 | 2/1997 | Yasuda | 74/502.4 |
| 5,605,074 | 2/1997 | Hall et al. | 74/502.6 |
| 5,682,797 | 11/1997 | Kelley et al. | 403/316 X |
| 5,709,132 | 1/1998 | Irish et al. | 1/10 |

Primary Examiner—Vinh T. Luong
Attorney, Agent, or Firm—Howard & Howard

[57] ABSTRACT

The locking terminal (18, 40, and 64) includes a plurality of cantilevered arms (56) defining a pocket (58). The arms (56), normally disposed in a retaining position for retaining a controlled member (62) in the pocket (58), are moveable to a receiving position for receiving the controlled member (62) into the pocket (58). The terminal (18, 40, and 64) further includes a locking means (65) for locking the arms (56) in the retaining position to lock the controlled member (62) in the pocket (58). The locking means (65) is movably supported by the terminal (18, 40, and 64) for movement between a locking position to lock the arms (56) in the retaining position and a release position allowing the arms (56) to move to the receiving position.

8 Claims, 4 Drawing Sheets

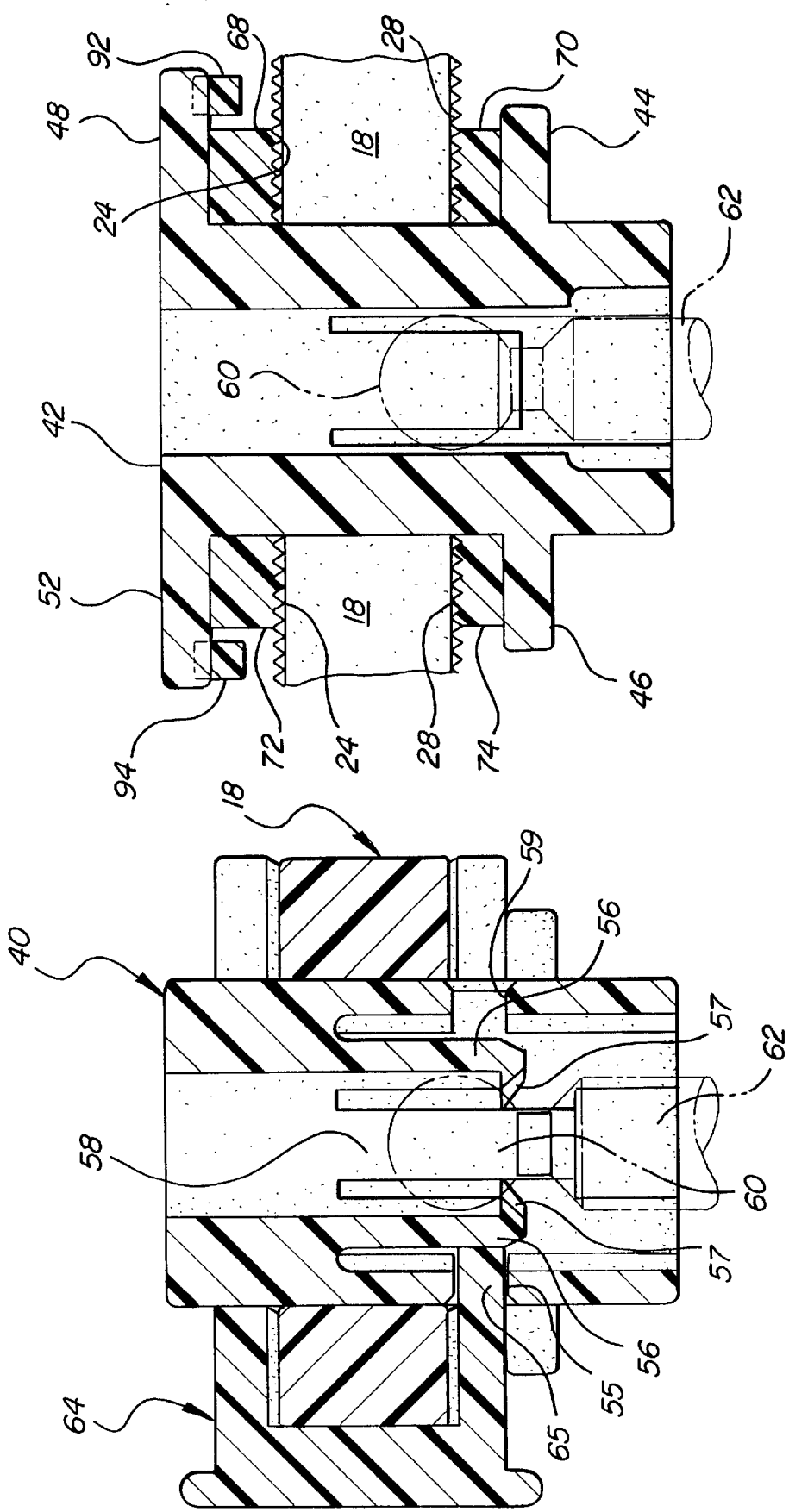

REMOTE CONTROL ASSEMBLY HAVING A LOCKING TERMINAL

BACKGROUND OF THE INVENTION

1. Field of the Invention

The subject invention relates generally to a motion transmitting remote control assembly of the type for transmitting forces along a curved path and, more specifically, to a locking terminal therefor.

2. Description of the Prior Art

Motion transmitting remote control assemblies of the type for transmitting motion in a curved path by means of a flexible motion transmitting core element are frequently used in automotive applications to control the movement of a device from a remote location. For example, the air intake valve of an internal combustion engine is typically controlled from either a foot pedal or hand lever. Other examples include the remote manipulation of transmissions, ventilation systems, fuel doors, and hood releases via a motion transmitting remote control assembly. Such motion transmitting remote control assemblies may comprise a protective sheath-like conduit which slidably supports an internal moving core element. The conduits are often of the composite type having an inner tubular liner defining the internal boundaries of a core passage, at least one metallic supportive lay wire wrapped helically about the liner, and an outer cover disposed about the lay wire. Alternatively, the conduit may be of the more traditional Bowden type construction. The core element may be either a single wire or a multi-stranded cable.

For applications involving relatively high longitudinal force transfer, such as when remotely controlling an automatic transmission, the assembly must be securely connected to a portion of the controlled member, typically a ball stud. The prior art has taught to establish a terminal having a flexible bushing or a plurality of arms to receive and retain the ball stud. Accordingly, there is a need for a remote control assembly having a terminal which may lock to the controlled member.

SUMMARY OF THE INVENTION AND ADVANTAGES

The present invention provides a motion transmitting remote control assembly for transmitting motion along a curved path. The assembly includes a flexible motion transmitting core element and a terminal attached to one end of the core element. The terminal includes a plurality of cantilevered arms defining a pocket. The arms, normally disposed in a retaining position for retaining a controlled member in the pocket, are moveable to a receiving position for receiving the controlled member into the pocket. The assembly is characterized by a locking means for locking the arms in the retaining position to lock the controlled member in the pocket. Accordingly, the invention provides a terminal which may be positively locked upon the controlled member to transfer very high loads without being inadvertently removed.

BRIEF DESCRIPTION OF THE DRAWINGS

Other advantages of the present invention will be readily appreciated as the same becomes better understood by reference to the following detailed description when considered in connection with the accompanying drawings wherein:

FIG. 4 is a cross-sectional view taken along line 4—4 of FIG. 2 of the remote control assembly connected to the controlled member with the locking means shown in a locking position; and FIG. 5 is a cross-sectional view taken along line 5—5 of FIG. 2 of the remote control assembly connected to the controlled member with the interlock shown sandwiched between the length adjuster and the slider.

DETAILED DESCRIPTION OF THE PREFERRED EMBODIMENT

Figure 1:
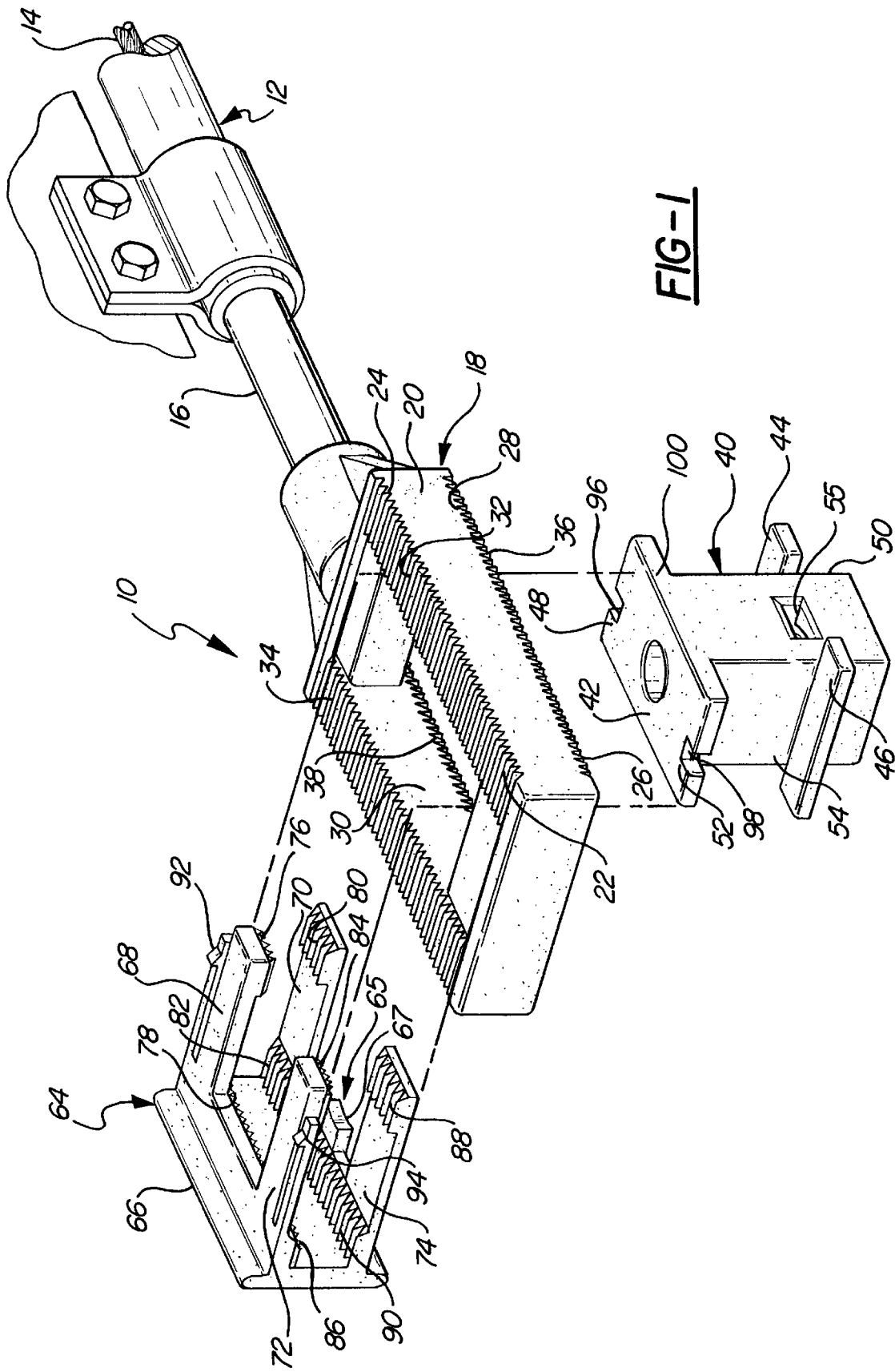
FIG. 1 is an exploded view of a remote control assembly according to the present invention including a length adjuster, a slider, and an interlock having a locking means.

Referring to the Figures, wherein like numerals indicate like or corresponding parts throughout the several views, a motion transmitting remote control assembly is generally shown at 10. The assembly 10 is of the type including a flexible conduit, generally indicated at 12, having a pair of spaced apart ends, only one of which is shown in FIG. 1. The conduit 12 is preferably of the composite type having an inner tubular liner defining the internal boundaries of a core passage, at least one metallic supportive lay wire wrapped helically about the liner, and an outer cover disposed about the lay wire.

A flexible core element 14 is slidably disposed in the conduit 12 for conveying longitudinal forces therealong. The core element 14 extends from both ends of the conduit 12 and attaches, respectively, to controlling and controlled members. For example, the controlling end of the core element 14 may be connected to a shift lever (not shown) in the passenger compartment, whereas the controlled end of the core element 14 may be connected to the automatic transmission (also not shown). In the forgoing example where the core element 14 is required to transmit both tensile and compressive forces, a rigid extension 16 is fixedly connected to the end of the core element 14 to provide column strength. In such circumstances, it is customary to encase a portion of the rigid extension 16 in a swivel tube as will become apparent to those skilled in the art. Of course, other applications of a motion transmitting remote control assembly which includes a conduit 12 and a core element 14 are possible without departing from the invention as defined in the appended claims, and that many various alternative configurations of the preferred embodiment disclosed herein are likewise possible.

Because of the inevitable dimensional variations between controlling and controlled devices in a typical motor vehicle, a length adjuster, generally indicated at 18, is provided for adjusting the longitudinal length of the core element 14. Those skilled in the art will appreciate that the length adjuster 18 can be readily modified to adjust the length of the conduit 12 instead of the core element 14 to accomplish essentially the same results. The length adjuster 18 prevents slack or over-tension in the remote control assembly 10, relaxes the dimensional controls observed during fabrication of the assembly 10, and also simplifies the vehicle installation process.

As shown in FIG. 1, the length adjuster 18 includes a housing 20 having a first set of transverse teeth 22 along a first surface 24 and a second set of transverse teeth 26 along a second surface 28. The second surface 28 of housing 20 is opposite the first surface 24. The housing 20 has a generally rectangular shape including an interior opening 30 extending in the longitudinal direction and having a predetermined width. The first set of teeth 22 and the second set of teeth 26 run perpendicularly to the opening 30 and are positioned on flanking sides of the opening 30. The first set of teeth 22 includes a top front row of teeth 32 adjacent one side of the interior opening 30 and a top back row of teeth 34 adjacent the opposite side of the interior opening 30. The second set of teeth 26 includes a bottom front row of teeth 36 adjacent one side of the interior opening 30 and a bottom back row of teeth 38 adjacent the opposite side of the interior opening 30. In the preferred embodiment, the rigid extension 16 of the core element 14 is embedded in the housing 20, as by an overmolding operation. In this manner, the housing 20 and core element 14 are integrally secured to one another.

Figure 2:
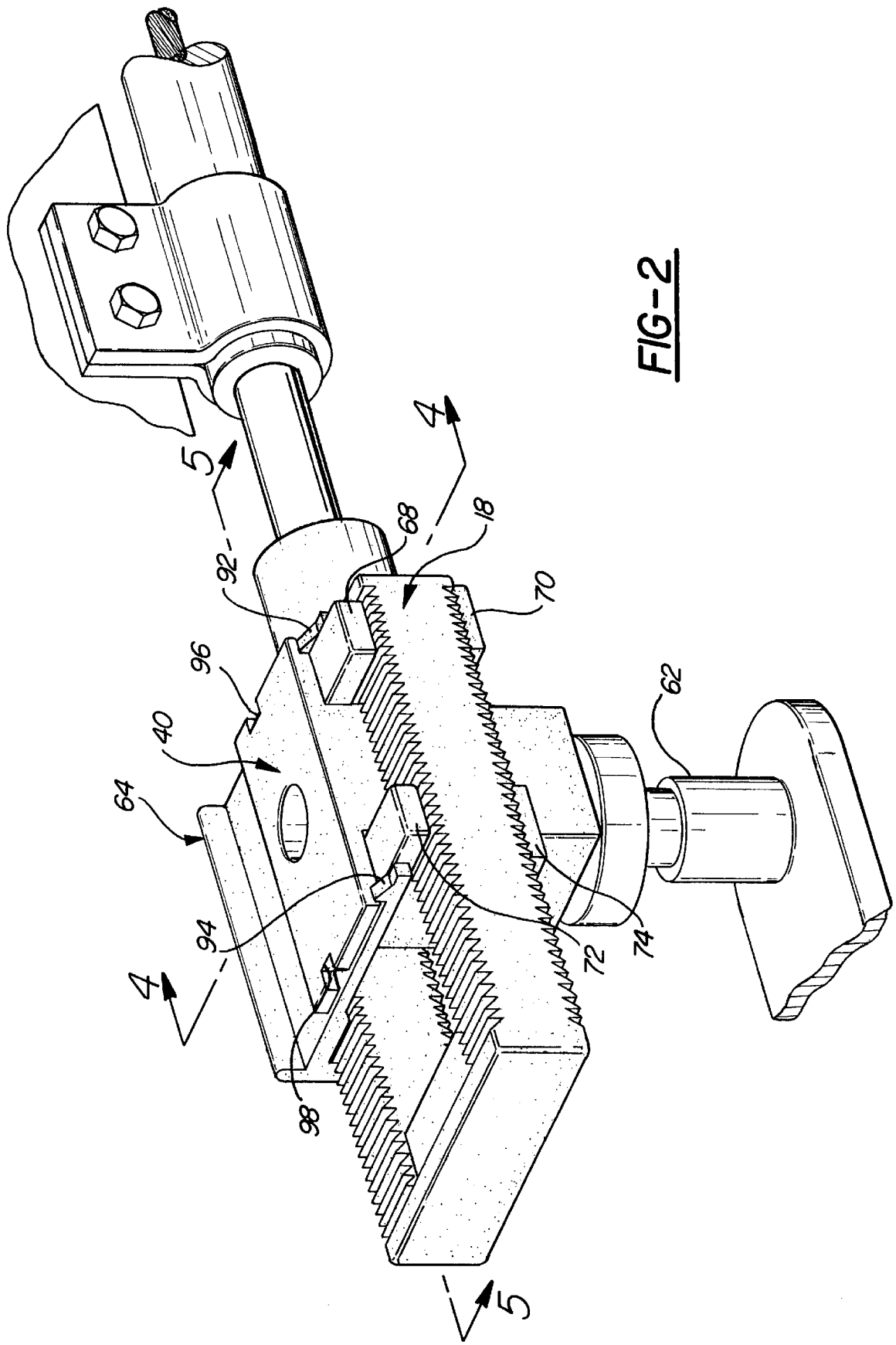
FIG. 2 is a perspective view of the remote control assembly connected to a controlled member with the interlock shown in a locked position.

The assembly 10 further includes a slider 40 longitudinally moveable within the predetermined width of the opening 30. The slider 40 includes a head 42, a first shelf 44, and a second shelf 46. The head 42 is defined by a first flange 48 extending longitudinally from a first side 50 of the slider 40 and a second flange 52 extending longitudinally from a second side 54 opposite the first side 50 of the slider 40. The head 42, including first flange 48 and second flange 52, is more narrow than the predetermined width of the opening 30 allowing the head 42 to be inserted up through the opening 30. The first shelf 44 and the second shelf 46 extend longitudinally from the first side 50 and the second side 54 of the slider 40 respectively. Further, the first shelf 44 and the second shelf 46 extend transversely from the first side 50 and the second side 54 respectively to be wider than the predetermined width of the opening 30 thereby preventing the slider 40 from passing completely through the opening 30 as shown in FIG. 2. In this manner, the slider 40 is free to travel longitudinally back and forth in the opening 30 between maximum and minimum length adjusted positions. The maximum length adjusted position, defined by the end of the opening 30 distal the rigid extension 16 of the core element 14, establishes the maximum length to which the core element 14 can be adjusted by the length adjuster 18. Conversely, the minimum length adjusted position, defined by the end of the opening 30 proximate the rigid extension 16 of the core element 14, establishes the minimum length to which the core element 14 can be adjusted by the length adjuster 18.

The slider 40 further includes a first slot 55 and a plurality of cantilevered arms 56 defining a pocket 58 as shown in FIG. 4. The arms 56 are normally disposed in a retaining position for retaining a controlled member 62 in the pocket 58 but may be flexed to a receiving position for receiving the controlled member 62. Each arm 56 includes a radially extending hook 57 for retaining the controlled member 62 in the pocket 58. Each hook 57 is chamfered to facilitate the flexing of the arms 56 when receiving the controlled member 62 into the pocket 58. In a preferred embodiment, the slider includes two cantilevered arms 56, and a second slot 59 on the side of the slider 40 opposite to the first slot 55. Preferably, a ball stud 60, as shown in phantom, extends from the controlled member 62 such as an automatic transmission. The entire slider 40, including head 42, first shelf 44, second shelf 46, and arms 56, may be integrally manufactured through an injection molding operation.

Assembly 10 further includes an interlock, generally indicated at 64, transversely movable relative to the slider 40. The interlock 64 includes a locking means 65 movably supported by the interlock 64 for movement between a locking position, as shown in FIG. 4, to lock the arms 56 of slider 40 in the retaining position and a release position allowing the arms 56 to move to the receiving position. In a preferred embodiment, the locking means 65 is a tongue 67 extending through the first slot 55 of slider 40 to lock one of the arms 56 in the retaining position. Alternatively, the tongue 67 may be inserted into the second slot 59 from the opposite direction.

The interlock 64 further includes a rectangular-shaped frame 66, a first pair of top and bottom legs 68, 70, and a second pair of top and bottom legs 72, 74. Each pair of legs 68, 70 and 72, 74 extend perpendicularly from the frame 66. The first pair of top and bottom legs 68, 70 and the second pair of legs 72, 74 are spaced to receive the longitudinal length of the slider 40. In other words, the distance between the first pair of legs 68, 70 and the second pair of legs 72, 74 is equal to or slightly greater than the longitudinal length of the slider 40. Each pair of legs 68, 70 and 72, 74 are spaced to receive the height of length adjuster 18. In other words, the distance between first top leg 68 and first bottom leg 70 and the distance between second top leg 72 and second bottom leg 74 is equal or slightly greater than the height of length adjuster 18. As shown in FIGS. 2 and 5, the assembly 10 is assembled with the first top leg 68 sandwiched between the first flange 48 of head 42 and the first surface 24 of length adjuster 18, the first bottom leg 70 sandwiched between the second surface 28 of length adjuster 18 and the first shelf 44, the second top leg 72 sandwiched between the second flange 52 of head 42 and the first surface 24 of length adjuster 18, and the second bottom leg 74 sandwiched between the second surface 28 of length adjuster 18 and second shelf 46.

As best shown in FIG. 1, the first top leg 68 has at least one top front tooth 76 and at least one top back tooth 78. The first bottom leg 70 has at least one bottom front tooth 80 and at least one bottom back tooth 82. The second top leg 72 has at least one top front tooth 84 and at least one top back tooth 86. The second bottom leg 74 has at least one bottom front tooth 88 and at least one bottom back tooth 90. Front teeth 76, 80, 84, and 88 are spaced from back teeth 78, 82, 86, and 90 respectively to operate accordingly in a shipping position and a locked position.

Figure 3:
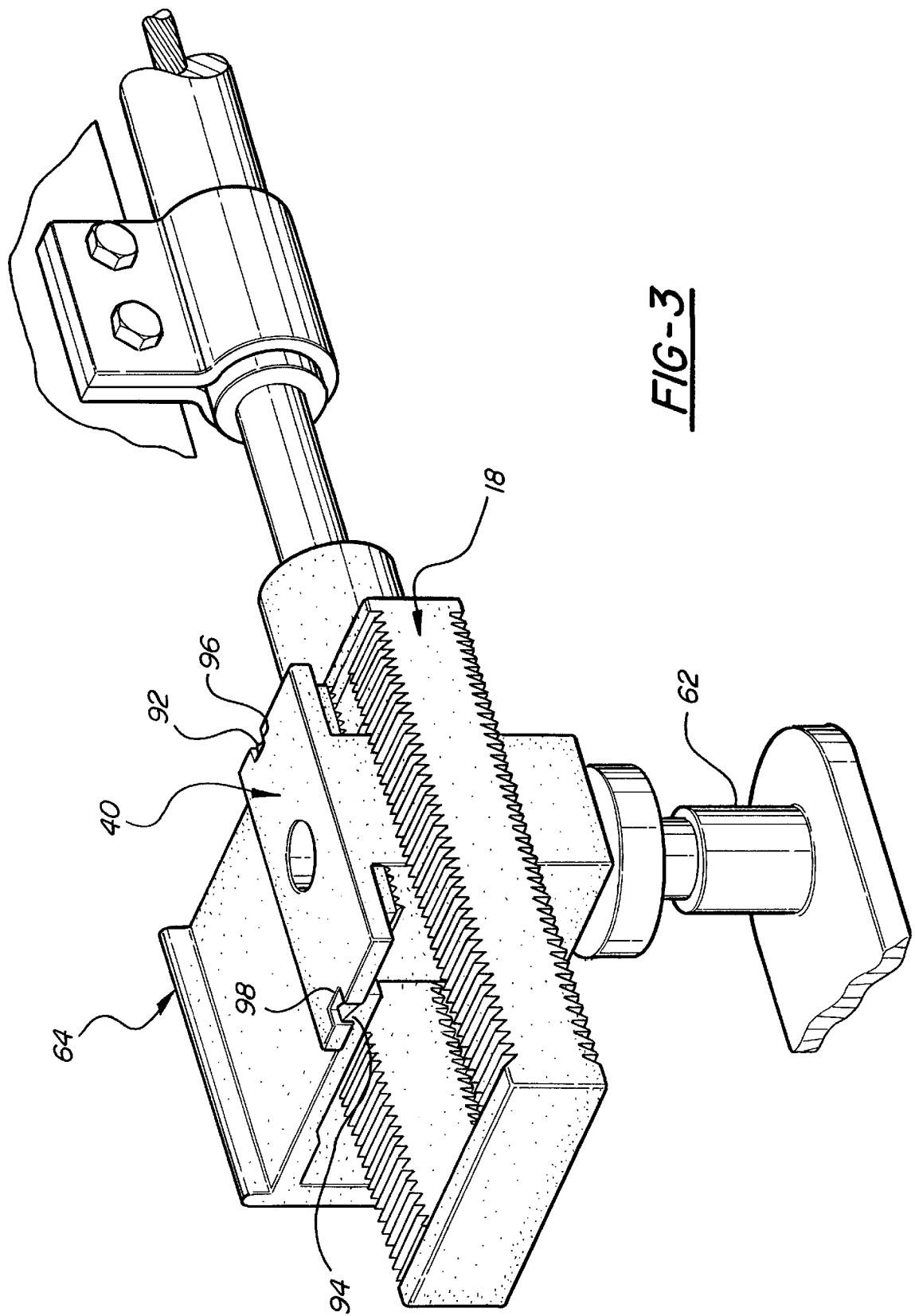
FIG. 3 is a perspective view of the remote control assembly connected to the controlled member with the interlock shown in a shipping position.

When interlock 64 is in the shipping position, as shown in FIG. 3, the top front teeth 76 and 84 are disengaged from the top front row of teeth 32 of length adjuster 18 and positioned within opening 30 of housing 20, the bottom front teeth 80 and 88 are disengaged from the bottom front row of teeth 36 of length adjuster 18 and positioned within opening 30 of housing 20, the top back teeth 78 and 86 are disengaged from the top back row of teeth 34 of length adjuster 18 and positioned outside of housing 20, and the bottom back teeth 82 and 90 are disengaged from the bottom back row of teeth 38 of length adjuster 18 and positioned outside of housing 20. This allows free sliding movement of the slider 40 in the opening 30 between the maximum and minimum length adjusted positions as described above.

When interlock 64 is manually shifted to the locked position, as shown in FIG. 2, the top front teeth 76 and 84 engage the top front row of teeth 32 of length adjuster 18, the bottom front teeth 80 and 88 engage the bottom front row of teeth 36 of length adjuster 18, the top back teeth 78 and 86 engage the top back row of teeth 34 of length adjuster 18, and the bottom back teeth 82 and 90 engaged the bottom back row of teeth 38 of length adjuster 18. The interlock teeth engage the length adjuster teeth to transfer longitudinal forces therebetween and thus manipulate the controlled member which in the example thus given is an automatic transmission. As the legs 68, 70, 72, and 74 bear directly against the slider 40, the transfer of longitudinal forces pass from the core element 14, to the rigid extension 16, to the housing 20, through the mating interlock and length adjuster teeth, to the legs 68, 70, 72, and 74, to the slider 40, and finally to the ball stud 60, and vice versa.

Assembly 10 further includes a pair of cantilevered latches or catches 92 and 94 for restraining the interlock 64 in the locked position and for retaining the tongue 67 in the locking position. Each catch 92 and 94 is effectively isolated from the longitudinal forces transmitted between the core element 14 and the ball stud 60 without unfavorable effects resulting from the longitudinal forces. Catches 92 and 94 extend parallel and adjacent to top legs 68 and 72 respectively. Head 42 includes a pair of notches 96 and 98 in first flange 48 and second flange 50 respectively to receive catches 92 and 94 and provide degree of resistance in the shipping position. When interlock 64 is manually shifted to the locked position, catches 92 and 94 automatically engage a longitudinal edge 96 of shelf 42 thereby restraining the interlock 64 in the locked position and retaining the tongue 67 in the locking position. When catches 92 and 94 are selectively deflected away from the longitudinal edge 100 of shelf 42, interlock 64 may be manually returned to the shipping position with the tongue 67 being moved to the release position. One skilled in the art will appreciate that the present invention may be practiced with one cantilevered catch.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A motion transmitting remote control assembly (10) for transmitting motion along a curved path, said assembly (10) comprising:

a flexible motion transmitting core element (14);

a terminal (40) attached to one end of said core element (14);

said terminal (18, 40, and 64) including a plurality of parallel cantilevered arms (56) disposed around a pocket (58), said arms (56) normally disposed in a retaining position for retaining a controlled member (62) in said pocket (58) and may be flexed to a receiving position for receiving the controlled member (62) into said pocket (58); and a lock (65) for locking said arms (56) in said retaining position to lock the controlled member (62) in said pocket (58), said lock (65) being movably supported by said terminal (18, 40 and 64) for movement transversely to said arms (56) between a locking position to lock said arms (56) in said retaining position and a release position allowing said arms (56) to flex to said receiving position.

2. An assembly (10) as set forth in claim 1 further including a latch (92) to retain said lock (65) in said locking position.

3. An assembly (10) as set forth in claim 2 wherein said terminal (18, 40, and 64) includes a first slot (55) and said lock (65) comprises a tongue (67) extending through said first slot (55) to lock one of said arms (56) in said retaining position.

4. An assembly (10) as set forth in claim 3 wherein each of said arms (56) includes a radially extending hook (57) for retaining said controlled member (62) in said pocket (58).

5. An assembly (10) as set forth in claim 4 wherein said hook (57) of each of said arms (56) is chamfered to facilitate said flexing of said arms (56) when receiving said controlled member (62) into said pocket (58).

6. An assembly (10) as set forth in claim 3 including only two of said arms (56).

7. An assembly (10) as set forth in claim 6 wherein said terminal (18, 40, and 64) includes a second slot (59) on the side of said terminal (18, 40, and 64) opposite to said first slot (55) to receive said tongue (67) from the opposite direction.

8. An assembly (10) as set forth in claim 1 wherein said terminal (18, 40, and 64) includes a length adjuster (18), a slider (40) including said arms (56), and an interlock (64) including said lock (65), with said interlock (64) locking said slider (40) in a fixed position relative to said length adjuster (18).

\* \* \* \* \*